Aug. 12, 1941. D. F. NEWMAN Re. 21,875

PROJECTION APPARATUS

Original Filed Aug. 12, 1932 2 Sheets-Sheet 1

INVENTOR
David F. Newman
BY
Ward, Crosby & Neal
ATTORNEYS

PROJECTION APPARATUS

Original Filed Aug. 12, 1932 2 Sheets-Sheet 2

INVENTOR
David F. Newman
BY
Ward, Crosby & Neal
ATTORNEYS

Reissued Aug. 12, 1941 Re. 21,875

UNITED STATES PATENT OFFICE 21,875

PROJECTION APPARATUS

David F. Newman, Mountain Lakes, N. J., assignor to Trans-Lux Corporation, a corporation of Delaware Original No. 2,102,161, dated December 14, 1937, Serial No. 628,529, August 12, 1932. Application for reissue December 11, 1939, Serial No. 308,655

5 Claims. (Cl. 88—24)

My invention relates generally to projection apparatus of that type wherein a character-bearing tape is drawn through a projection field at a rate varying in accordance with the rate of tape ejection from a suitable printing device.

My invention has particular reference to a novel projection field per se of projection apparatus of the character stated.

Various other objects, advantages and characteristics of my invention will become apparent from the following detailed description taken in connection with the accompanying drawings.

My invention resides in the projection apparatus, features and details of construction of the character hereinafter described and claimed.

For an understanding of my invention and for an illustration of some of the various forms thereof, reference is to be had to the accompanying drawings, in which.

Figure 1:
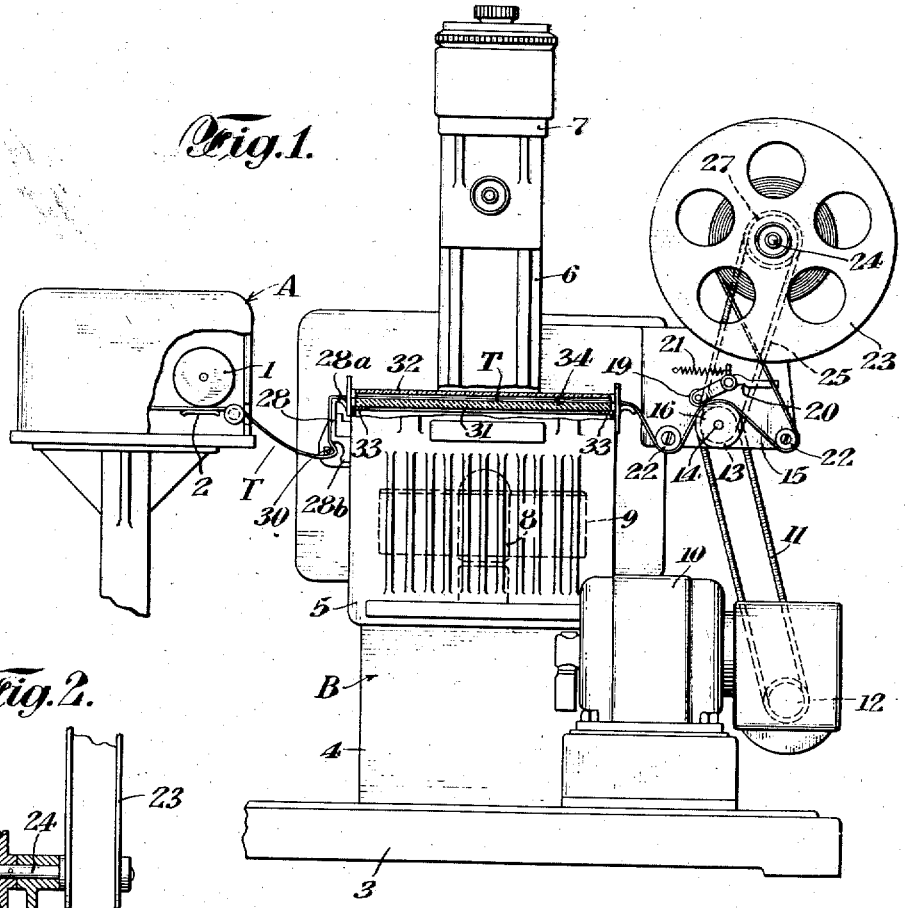
Figure 1 is a front elevational view, partly in section, of a projection system as constructed in accordance with my invention.
Figure 2:
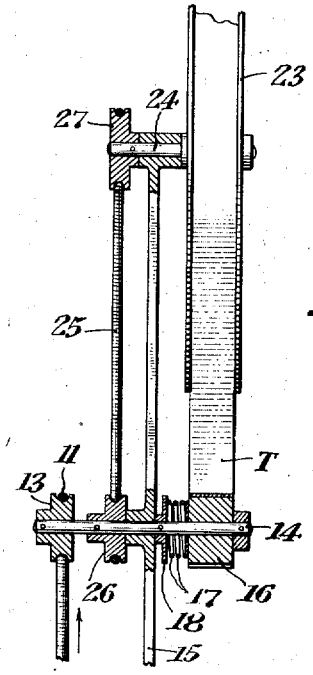
Fig. 2 is a transverse vertical sectional view, partly in elevation, of a part of the mechanism shown in Fig. 1.

Referring to Fig. 1, A represents any suitable printing device which, as herein shown, may be a stock ticker mechanism of a type well known to the art. A ticker mechanism of this type comprises a printing wheel 1 and a movable platen 2 by which characters are printed lengthwise of a tape T which is intermittently ejected from the ticker mechanism in accordance with the rate of printing.

After ejection from the ticker mechanism, the tape T, in accordance with the invention of this application, is drawn through the projection field of any suitable projector B which, in the example shown, is generally of the character described in the copending Halloran application Serial No. 373,767, filed June 26, 1929, now Patent 1,952,249. When of this character, the projector B comprises a base 3 from which rises a standard 4 carrying a housing 5 which, in turn, supports a standard 6 on which an objective lens 7 is mounted. Light from any suitable source 8 passes horizontally through one element of a condensing lens system, not shown, then engages a mirror 9 by which the light beam is deflected upwardly to pass first through another element of the condensing lens system and then through the projection field together with the tape section disposed therein, the light beam thereafter traversing the objective lens 7 and then, by any suitable reflecting system, not shown, passing to a suitable screen on which appear images of the tape-borne characters then in the projection field.

The tape T may be pulled through the projection field by any suitable mechanism, and this mechanism may be controlled in any suitable manner so that the tape movement through the projection field is approximately proportional to the rate of ejection thereof from the ticker mechanism.

As herein disclosed, there is thus utilized an electric motor 10 which, through suitable gearing, operates an endless belt 11 mounted on pulleys 12 and 13. The pulley 13 is pinned to a shaft 14 rotatably mounted in bearings formed in an extension 15 of the housing 5. Mounted for free rotatable movement on the shaft 14 is a tape-pulling roll 16 which, as hereinafter described, is connected to the shaft 14 for rotatable movement therewith by clutch mechanism of any suitable character. As herein diagrammatically illustrated, said clutch mechanism comprises a helical spring 17 which is interposed between one face of the roll 16 and one face of an adjacent disk 18 pinned to the shaft 14 for rotatable movement therewith. Coactable with the roll 16 is a roll 19 carried by a pivoted arm 20 which is biased in a counter-clockwise direction, Fig. 1, by a suitable spring 21.

The tape T, after leaving the projection field, passes around an idler roll 22, then between the coacting pair of rolls 16 and 19, then around another idler roll 22, and then is wound upon a reel 23 rotatably mounted on a shaft 24 journaled in an extension of the frame 15. The shaft 24 is operated by an endless belt 25 mounted on pulleys 26 and 27, the pulley 26 being pinned to the hereinbefore described shaft 14 and the pulley 27 being pinned to the shaft 24.

Disposed at the entrance to the projection field is an arrangement of any suitable character for applying a retarding or binding force to the tape T each time that the operation of the ticker mechanism is discontinued, it being understood that mechanisms of this character operate irregularly and at a rate dependent upon the activity of the stock exchange dealings. In the example shown, there is thus utilized an arrangement of the character disclosed in the copending Cavalcante application Serial No. 596,143, filed March 7, 1932, such arrangement comprising a frame including a vertical plate 28 from which extends an upper horizontal and downwardly curved plate 28*a* forming a support for the tape T just prior to passage thereof into the projection field. The plate 28 comprises a lower section 28*b* interiorly formed with a curved passageway adjacent which the tape passes during operation of the tape-pulling mechanism. Suitably secured to opposite faces of the plate 28 are members 29 each of which, on the lower interior surface thereof, carries a member 30 more or less wedge-shaped with the apex of the wedge directed toward the projection field. The members 30 are spaced apart, opposite edges of the tape T being coactable therewith in the manner hereinafter to be described.

Figure 3:
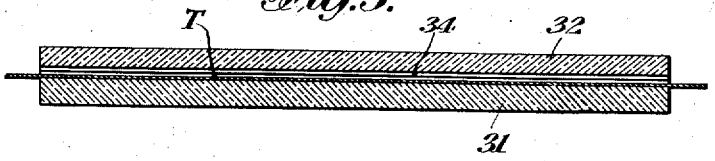
Fig. 3 is an enlarged vertical sectional view of the projection field arrangement shown in Fig. 1.

In accordance with my invention, a projection field of novel character is utilized with the hereinbefore described projector. One form of this novel projection field is shown in Figs. 1, 3, and 4 wherein there is illustrated lower and upper plates 31 and 32 supported in suitable manner preferably horizontally, the lower plate 31 preferably resting upon suitable ledges 33 of the projector housing 5 and the upper plate 32 preferably resting upon the lower plate 31.

Figure 4:
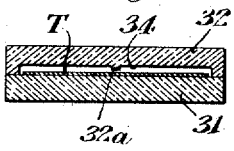
Fig. 4 is a transverse vertical sectional view of the arrangement shown in Fig. 3.

The plates 31 and 32 are formed from glass or other suitable transparent material and, as shown in Fig. 4, the width thereof exceeds that of the tape T. In accordance with a preferred form of the invention, the plates 31 and 32 form with each other a channel 34 only slightly greater in width and height than the respective corresponding dimensions of the tape T.

With the tape T positioned as shown in Fig. 1, it will be observed that said tape extends from the ticker mechanism around the members 30, vertically along the plate 28, horizontally along the plate 28*a*, between the upper and lower plates 32 and 31, and then through the pulling mechanism and onto the reel 23 in the manner hereinbefore described.

The motor 10 is one which operates continuously to cause continuous rotation of the shaft 14. As shown, the tape T has been drawn into binding relation with respect to the members 30 and, as a result, a retarding force is applied to said tape whereby it is placed under tension. When the tape is thus retarded or placed under tension, the pulling roll 18 slips with respect to the shaft 14, the spring 17 being so designed that it becomes ineffective to transmit rotary movement from the disk 18 to the roll 16 when the tape is thus placed under tension. In this manner, movement of the tape through the projection field is discontinued when operation of the ticker mechanism is discontinued.

When operation of the ticker mechanism is again initiated, the tape T forms a more or less free loop between said mechanism and the projection field whereupon the binding action on the tape heretofore existing at the members 30 is eliminated. As a result, the tension on the tape is decreased sufficiently to again permit operation of the pulling roll 16 under the driving influence of its clutch spring 17. Accordingly, the tape is drawn through the projection field until operation of the ticker mechanism is again discontinued whereupon the cycle of operations hereinbefore described again occurs.

While passing through the projection field, the tape T traverses the channel 34 formed by the members 31 and 32. As stated, the dimensions of this channel are slightly greater than those of the tape T and, therefore, the tape passes freely therethrough. In a preferred form of the invention, these dimensions are only slightly greater than those of the tape T and, therefore, said tape moves along the channel 34 regularly, evenly and without any substantial vibrations such as might otherwise be transmitted thereto due to the pulsing action of the ticker mechanism. Since the members 31 and 32 are formed of glass or other transparent material, it results that the projecting light beam readily traverses the same to effect clear and efficient projection of the characters on the tape T.

As shown particularly in Fig. 4, it is highly desirable for the upper plate 32, intermediate the longitudinal sides thereof, to have a rib 32*a* which projects toward the plate 31. The distance between the rib 32*a* and the plate 31 is preferably only slightly greater than the thickness of the tape T although this relation may be varied somewhat as desired. It is well understood in the art that characters on a ticker tape are printed in two longitudinal rows slightly spaced apart. The rib 32*a* is so disposed that it is directly above the space between the two rows of printed characters and its function is to retain the tape toward the plate 31 so that the upper tape surface does not contact with the lower surface of the plate 32. Should the latter happen, smudging of the ink forming the tape characters might occur, this, of course, being highly objectionable from a projection viewpoint.

Figure 5:
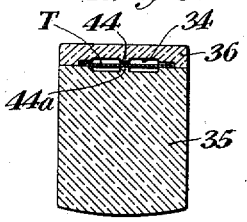
Figs. 5 and 6 are transverse and longitudinal vertical sectional views respectively, of a modified form of projection field arrangement.
Figure 6:
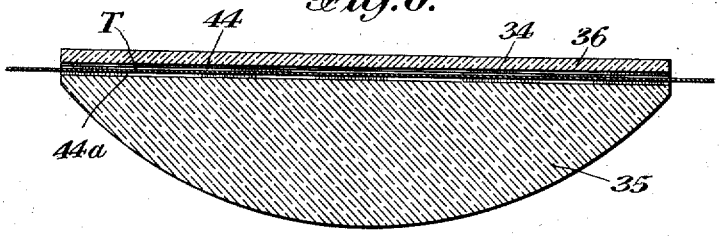

In the form of my invention illustrated in Figs. 5 and 6, the lower and upper members forming the channel 34 traversed by the tape T while passing through the projection field are designated at 35 and 36. The upper member 36 is substantially the same as the hereinbefore described upper member 32 but the lower member 35 has a lens effect and, more particularly, a condensing lens effect. Under some circumstances, it is advantageous to thus combine a lens with the tape-guiding arrangement.

Figure 7:
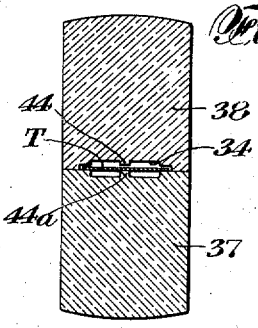
Figs. 7 and 8 are transverse and longitudinal vertical sectional views, respectively, of another modified form of projection field arrangement.
Figure 8:
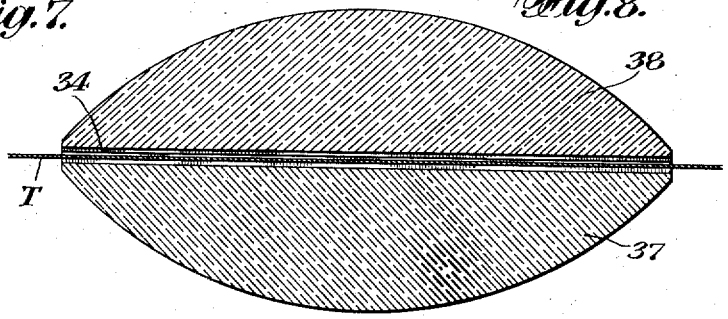

Referring to Figs. 7 and 8, lower and upper members 37 and 38 are shown as utilized for forming the aforesaid channel 34. In this form of the invention, the member 37 has a lens effect and particularly a condensing lens effect, while the member 38 functions as a magnifying lens, the power of which is properly related to focal length of the objective lens included in the projection system.

Figure 9:
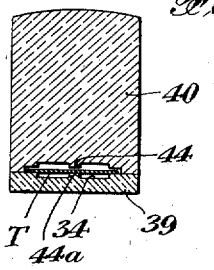
Figs. 9 and 10 are transverse and longitudinal vertical sectional views, respectively, of another modified form of projection field arrangement.
Figure 10:
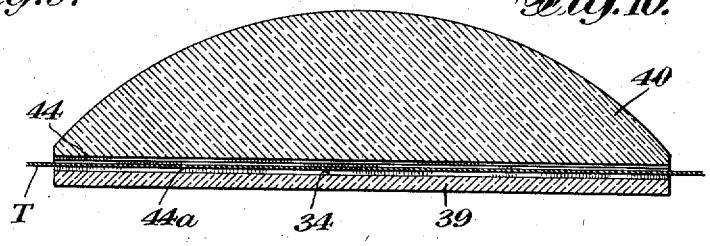

The modification shown in Figs. 9 and 10 is explanatory of another variation of the invention. The lower member 39 of Figs. 9 and 10 corresponds generally with the upper member 36 of Figs. 5 and 6 while the upper magnifying lens member 40 of Figs. 9 and 10 corresponds generally with the lens member 38 of Figs. 5 and 6.

Figure 11:
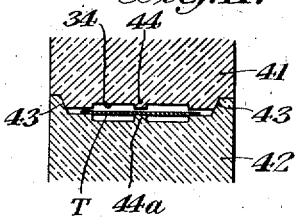
Figs. 11 and 12 are transverse, vertical sectional views showing further modifications of the invention.

In Fig. 11, there are illustrated upper and lower members 41 and 42 which form the hereinbefore described channel 34. Said members 41 and 42 may correspond with the members 31 and 32 of Fig. 3 or either or both of them may have a lens effect as desired and as hereinbefore described. This figure, namely, Fig. 11 is illustrative at 43 of one of the many forms of interlocking joints which may be provided, if desired, for any of the herein described sets of members forming a tape guide channel 34.

In Figs. 1, 3, and 4, the channel 34 is shown as having a single rib 32*a* extending thereinto whereas, in Figs. 5–11 inclusive, said channel 34, in a slightly modified form, if desired, is shown as being at both sides of a pair of facing ribs 44, 44*a* formed on the respective upper and lower tape-guiding members. It shall be understood that the channel configuration of Figs. 1, 3, and 4 may be employed with the arrangements shown in Figs. 5–11 inclusive or vice versa as desired.

Figure 12:
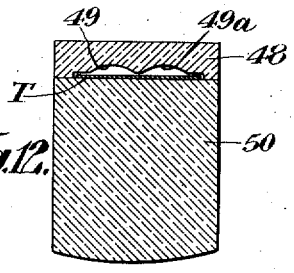

In Fig. 12, there is illustrated another tape channel variation. In Fig. 12, the upper member 48 is formed with symmetrical curved surfaces 49, 49*a* the upper surface of the lower member 50 being of plane configuration. It shall be understood that the upper and lower tape guiding members of Fig. 12 may be of lens or non-lens character as desired.

As hereinbefore stated, the channel 34 preferably has dimensions slightly greater than those of the tape T. In practice, if desired, this arrangement may be varied by providing the channel 34 with dimensions sufficiently small to insure a frictional drag on the tape somewhat greater than that caused by the mere action of gravity alone.

It shall be understood that either or both of the upper and lower members forming the channel 34 may be of skeleton configuration so that little or no material is interposed in the path of the projecting light beam. Further, it shall be understood that said upper and lower channel-forming members need not be separately formed since a desired arrangement, in accordance with my invention, may be obtained from a single structural unit. Still further, the channel forming members or structure at the surfaces over- and under-lying opposite longitudinal edges of the tape may be formed of opaque material if desired.

Although I have shown a particular arrangement for controlling movement of the character-bearing tape through the projection field, it shall be understood that my invention is not to be so limited because other equivalent tape pulling arrangements may be employed. Thus, for example, the well-known commercial lever or suction control arrangements may be utilized for starting and stopping an electrical motor so that the tape is pulled through the projection field approximately proportional to the rate of ejection thereof from the ticker mechanism.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A structure forming a projection field through which a character-bearing tape is drawn after ejection from a printing mechanism, said structure comprising members spaced apart to form a path therebetween for the passage of said tape, and a rib immovably fixed to and projecting from one of said members toward the other member, said rib extending longitudinally of said one member and being disposed substantially at the center thereof so as to be adapted to engage the tape substantially at its longitudinal center and hold the tape toward said other member, said structure being transparent to light throughout substantially the entire length thereof.

2. A structure forming a projection field through which is drawn a tape having characters printed thereon in ink by a printing mechanism, said structure comprising members spaced apart to form a path therebetween for the passage of said tape, and means fixed to and projecting from one of said members toward the other member, said means coacting with said tape to hold it toward said other member whereby smudging of the ink on said tape is substantially prevented, said structure being transparent to light throughout substantially the entire length thereof.

3. A structure forming a projection field through which a character-bearing tape is drawn after ejection from a printing mechanism, said structure comprising a supporting member for said tape as it passes through said projection field, and a fixed rib-like member extending toward said supporting member but spaced therefrom a distance greater than the thickness of said tape, said rib-like member extending longitudinally through said projection field and being so disposed with respect to the tape path that it is adapted to engage the tape substantially at its longitudinal center.

4. A structure forming a projection field through which a character-bearing tape is drawn after ejection from a printing mechanism, said tape moving through said projection field approximately in synchronism with the operation of said printing mechanism, said structure comprising a horizontal supporting member engaged on its upper surface by the tape as it passes through said projection field, said supporting member being formed from transparent material and having a length at least as long as that of the projection field, said projection field structure further comprising means coacting with the length of tape on said supporting member for producing a frictional drag on said tape greater than that caused by the action of gravity while it passes along said supporting member, said last named means being transparent to light rays, said frictional drag being imposed on the tape throughout the area of and while it is in said projection field and serving to cause the tape to closely engage said supporting member whereby the tape vibrations produced by said printing mechanism are largely or entirely eliminated.

5. A structure forming a projection field through which a character-bearing tape is drawn after ejection from a printing mechanism, said tape moving through said projection field approximately in synchronism with the operation of said printing mechanism, said structure comprising a horizontal supporting member engaged on its upper surface by the tape as it passes through said projection field, said supporting member being formed from glass and having a length approximately the same as that of the projection field, said projection field structure further comprising means coacting with the length of tape on said supporting member for producing a frictional drag on said tape greater than that caused by the action of gravity while it passes along said supporting member, said last named means being transparent to light rays, said frictional drag being imposed on the tape throughout the area of said projection field and throughout the length of the supporting member and serving to cause the tape to closely engage said supporting member whereby the tape vibrations produced by said printing mechanism are largely or entirely eliminated.

DAVID F. NEWMAN.